United States Patent
Han et al.

(10) Patent No.: US 6,849,690 B2
(45) Date of Patent: Feb. 1, 2005

(54) TRANSPARENT, RUBBER-MODIFIED STYRENE COPOLYMER

(75) Inventors: Chang-Hun Han, Yeosoo (KR); Oh-Jin Kwon, Daegoo (KR); Dae-Woo Lee, Yeosoo (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 10/450,759
(22) PCT Filed: Dec. 12, 2001
(86) PCT No.: PCT/KR01/02153
§ 371 (c)(1), (2), (4) Date: Jun. 12, 2003
(87) PCT Pub. No.: WO02/48224
PCT Pub. Date: Jun. 20, 2002

(65) Prior Publication Data
US 2004/0048982 A1 Mar. 11, 2004

(30) Foreign Application Priority Data
Dec. 12, 2000 (KR) .................................... 2000-0075654
Apr. 6, 2001 (KR) .................................... 2001-0018293

(51) Int. Cl.$^7$ .......................... C08L 53/02; C08L 51/09; C08F 287/00
(52) U.S. Cl. ............................ 525/84; 525/98; 525/99; 525/243; 525/316
(58) Field of Search ............................ 525/84, 98, 99, 525/243, 316

(56) References Cited

U.S. PATENT DOCUMENTS 4,100,228 A 7/1978 Dennis et al.
4,767,833 A * 8/1988 Yumoto et al. ............. 525/193

FOREIGN PATENT DOCUMENTS

| EP | 0 703 252 A2 | 3/1996 |
| JP | 4-180907 | 6/1992 |
| JP | 05-054484 | 3/1993 |
| JP | 7-330996 | 12/1995 |
| JP | 10-072512 | 3/1998 |

OTHER PUBLICATIONS

International Search Report for International Application No. PCT/KR 01/02153; Mar. 14, 2002.

International Preliminary Examination Report for International Application No. PCT/KR 01/02153; Dec. 17, 2002.

* cited by examiner

Primary Examiner—James J. Seidleck
Assistant Examiner—Olga Asinovsky
(74) Attorney, Agent, or Firm—Cantor Colburn LLP

(57) ABSTRACT

The present invention relates to a method of preparing rubber-modified styrene copolymer resin with excellent transparency and impact resistance, specifically to a method of preparing transparent resin of rubber-modified styrene copolymer comprising graft-copolymerizing styrene monomer and (meth)acrylate monomer in the presence of block or random styrene-butadiene copolymer which has 30–50% of styrene skeleton content and 20–40 cp of 5% toluene solution viscosity at 25 ¸É. According to the method of the present invention, the transparent resin containing the rubber particles of a double structure comprising onion and core-shell structure can provide transparent resin of rubber-modified styrene copolymer resin with excellent transparency and impact resistance as well as good gloss.

11 Claims, No Drawings

TRANSPARENT, RUBBER-MODIFIED STYRENE COPOLYMER

BACKGROUND OF THE INVENTION

(a) Field of the Invention

The present invention relates to a method of preparing transparent resin of rubber-modified styrene copolymer with excellent transparency and impact resistance, specifically, to a method of preparing transparent resin of rubber-modified styrene copolymer with excellent transparency and impact resistance comprising graft-copolymerizing styrene monomer and (meth)acrylate monomer in the presence of block or random styrene-butadiene copolymer which has 30~50% of styrene skeleton content and 20~40 cp of 5% toluene solution viscosity at 25° C.

(b) Description of the Related Art

A rubber-modified thermoplastic styrene resin with improved impact resistance is obtained by graft copolymerization of styrene monomer in the presence of rubber polymer. However, due to rubber particles dispersed in resin, conventional rubber-modified styrene resin looses its transparency, this is one of the merits of styrene resin, leading to the limited application.

For example, European patent laid-open No.0703252, and Japanese patent laid-open Nos.Hei5-54484 and Hei4-180907 disclosed graft-coplymerization of styrene monomer and (meth)acrylate monomer in the presence of rubber polymer in order to provide rubber-modified styrene resin with transparency.

However, in the transparent rubber-modified styrene resin prepared by the methods described in the patents above, the shape of grafted-rubber particle has mainly salami structure and only occasionally, they show onion structure or core-shell structure. The shape of rubber particle is affected by viscosity, molecular weight, and content of styrene skeleton of rubbery polymer and depends on the stirring speed of reaction mixture and degree of graft. Generally transparent rubber-modified styrene resin having particle shape of salami structure has an excellent impact resistance, but it has poorer transparency than core-shell structure. Resin transparency is better for the smaller rubber particle, and the particle of core-shell structure is better than that of salami structure. Furthermore, rubber-modified styrene resin having core-shell structure is also known to have excellent gloss. However, it has remarkably poor impact resistance. Onion structure has medium impact resistance of salami structure and core-shell structure.

Japanese patent laid-open No.Hei10-72512 disclosed the art to obtain small particle size while using salami structure. However, it still has a problem of poor transparency.

SUMMARY OF THE INVENTION

It is the objective of the present invention to provide a method of preparing rubber-modified styrene copolymer resin with excellent transparency and impact resistance.

It is another objective of the present invention to provide a rubber-modified styrene copolymer resin with excellent transparency and impact resistance as well as excellent gloss.

To accomplish these objectives, the present invention provides a method of preparing rubber-modified styrene copolymer resin with excellent transparency and impact resistance as well as excellent gloss comprising graft-copolymerizing styrene monomer and (meth)acrylate monomer in the presence of block or random styrene-butadiene copolymer which has 30~50% of styrene skeleton content and 20~40 cp of 5% toluene solution viscosity at 25° C. The rubber particles in the prepared transparent rubber-modified styrene copolymer resin have both onion and core-shell structure.

DETAILED DESCRIPTION OF THE INVENTION

The present invention will be explained in more detail hereinafter.

The present invention provides a method of preparing rubber-modified styrene copolymer resin with excellent transparency and impact resistance as well as excellent gloss comprising graft-copolymerizing styrene monomer and (meth)acrylate monomer in the presence of block or random styrene-butadiene copolymer which has 30–50% of styrene skeleton content and 20–40 cp of 5% toluene solution viscosity at 25° C. The rubber particles in the resin have a double structure of onion and core-shell.

To accomplish this objective, the present invention provides a method of preparing rubber-modified styrene copolymer resin comprising:

a) preparing raw material solution mixture by dissolving block or random styrene-butadiene copolymer which has 30~50% of styrene skeleton content and 20~40 cp of 5% toluene solution viscosity at 25° C. in mixed monomer of styrene monomer and (meth)acrylate monomer;

b) graft-copolymerizing said raw material solution mixture of a) in the first reactor of continuous polymerization apparatus having at least two reactors associated in a series;

c) graft-copolymerizing the copolymer of step b) by continuously feeding to the second reactor or further; and d) devolatilizing and palletizing the copolymer obtain from step c).

More specifically, the present invention provides a method of preparing rubber-modified styrene copolymer resin comprising:

a) preparing raw material solution mixture by dissolving 3 to 15 parts by weight of block or random styrene-butadiene copolymer which has 30~50% of styrene skeleton content and 20~40 cp of 5% toluene solution viscosity at 25° C. in 100 parts by weight of mixture comprising;

i) 30 to 60 parts by weight of styrene monomer; and ii) 40 to 70 parts by weight of (meth)acrylate monomer;

b) graft-copolymerizing said raw material mixing solution of a) in the first reactor of continuous polymerization apparatus having at least two reactors associated in a series at 120 to 145° C.;

c) graft-copolymerizing the copolymer of step b) by continuously feeding to the second reactor or further until the polymerization rate of 60 to 90% is reached; and d) devolatilizing and palletizing the copolymer obtained from step c).

The rubber-modified styrene copolymer resin of the present invention has excellent transparency and impact resistance as well as good gloss when rubber particles in the matrix resin have a double structure of onion and core-shell. Generally, particles with salami structure obtained from rubber-modified styrene resin have poor transparency and particles with core-shell structure have weak impact resistance. Particles with onion structure have medium impact resistance of salami structure and core-shell structure, but they have poorer transparency than core-shell structure. On the contrary, when onion structure and core-shell structure exist at the same time, both transparency and impact resistance are good.

In the above step a), block or random copolymer with 30 to 50% of styrene skeleton content can be used. When styrene skeleton content is less than 30% or more than 50%, particle shape of rubber does not show double structure of onion and core-shell structure, thus the balance of transparency and impact resistance can't be achieved. If styrene skeleton content is less than 30%, transparency decreases remarkably and if styrene skeleton content is more than 50%, impact resistance decreases.

The styrene-butadiene copolymer with 20~40 cp of 5% toluene solution viscosity at 25° C. has excellent transparency and impact resistance and double structure of onion and core-shell.

The amount of styrene-butadiene copolymer in the solution mixture in the step a) is preferably 3 to 15 parts by weight based on a) i) styrene monomer and a) ii) (meth) acrylate monomer, or mixture with solvent. If the copolymer has less than 3 parts by weight, impact resistance of prepared resin decreases remarkably and if more than 15 parts by weight, transparency decreases.

Styrene monomer of a) i) is one of the monomers selected from the group consisting of alkyl styrene, such as styrene, α-methyl styrene, o-methyl styrene, p-methyl styrene, m-methyl styrene, ethyl styrene, i-butyl styrene, or t-butyl styrene, and halogenated styrene, such as o-bromo styrene, p-bromo styrene, m-bromo styrene, o-chloro styrene, p-chloro styrene, or m-chloro styrene. Among these styrene is preferred. (Meth)acrylate monomer of a) ii) is the one selected from the group consisting of methyl methacrylate, ethyl methacrylate, n-butyl methacrylate, 2-methyl hexyl acrylate, and 2-ethyl hexyl acrylate. Among these, a mixture of methyl methacrylate and n-butyl acrylate is preferred.

In the raw material solution of the present invention, weight ratio of a) i) styrene monomer and a) ii) (meth) acrylate monomer is preferably 30 to 60:40 to 70. Transparency should be achieved by adjusting refractive index of styrene-butadiene copolymer with that of copolymer of a) i) styrene monomer and a) ii) (meth)acrylic acid ester monomer.

In the method of the present invention, rubber-modified styrene copolymer resin can be prepared by adding polymerization initiator, solvent, chain transfer agent, plasticizer, antioxidant, release-agent, lubricant, or ultraviolet absorbent used in the conventional polymerization.

Specifically, at least one polymerization initiator should be selected from the group consisting of peroxy ketal such as 1,1-bis(t-butylperoxy) -3,3,5-trimethyl cyclohexane; dialkyl peroxide such as di-t-butyl peroxide, or 2,5-dimethyl-2,5-di(t-butyl peroxy)hexane; diacyl peroxide such as dibenzoyl peroxide; peroxy ester such as t-butyl peroxy isopropyl carbonate; kenon peroxide such as cyclohexanone peroxide; and azo compound such as 2,2'-azobisisobutylonitrile. It is preferable to use organic peroxide to increase graft ratio and to decrease average size of rubber particles.

The solvent is used to decrease viscosity of copolymer solution to the amount of 10 to 25 parts by weight based on the monomer 100 parts by weight and it is selected from the group consisting of toluene, ethyl benzene, and xylene.

The chain transfer agent is used to regulate average molecular weight of rubber-modified styrene copolymer resin and it is selected form the group consisting of n-octyl mercaptan, n-dodecyl mercaptan, t-dodecyl mercaptan, and α-methyl styrene dimer.

Polymerization process used in the present invention can be continuous or batch bulk polymerization, solution polymerization, or bulk-suspension polymerization and it is preferable to use continuous bulk polymerization or solution polymerization in terms of productivity, evenness of quality and purify of the resin.

When the average particle size of rubber is less than or equal to 1.2 μm, transparency is excellent. It is preferable to have 0.4 to 0.8 μm of average rubber particle size in terms of transparency and impact resistance.

The present invention is further explained in more details with reference to the following examples and comparative examples. These examples, however, should not in any sense be interpreted as limiting the scope of the present invention.

EXAMPLE 1

After preparing raw material solution mixture comprising 7 parts by weight of styrene-butadiene block copolymer (40% of styrene skeleton content and 39 cp of 5% toluene solution viscosity at 25° C.), 35 parts by weight of styrene, 30 parts by weight of methyl methacrylate, 3 parts by weight of n-butyl acrylate, and 25 parts by weight of ethyl benzene, 0.03 parts by weight of 1,1-bis(t-butyl peroxy)-3,3,5-trimethyl cyclohexane as a polymerization initiator and 0.05 parts by weight of n-octyl mercaptan as a chain transfer agent were added thereto.

The raw material solution mixture was continuously graft-copolymerized in the continuous polymerization apparatus that was associated with four serial reactors. The inlet temperature was 125° C., and the outlet temperature was 145° C.

After removing residual monomers and solvent at 230° C. under 20 torr in devotalizer, final product was palletized to obtain rubber-modified styrene copolymer resin.

As a result of analyzing TEM of the resin obtained from the above method, rubber particles of the resin showed double structure of onion and core-shell.

EXAMPLE 2

Rubber-modified styrene copolymer resin was prepared by the same method as Example 1 except that raw material solution mixture comprises 7 parts by weight of styrene-butadiene block copolymer (35% of styrene skeleton content and 20 cp of 5% toluene solution viscosity at 25° C.), 35 parts by weight of styrene, 30 parts by weight of methyl methacrylate, 3 parts by weight of n-butyl acrylate, and 25 parts by weight of ethyl benzene.

TEM result of the resin obtained from the above method showed that rubber particles had a double structure of onion and core-shell.

EXAMPLE 3

Rubber-modified styrene copolymer resin was prepared by the same method as Example 1 except that raw material solution mixture comprises 7 parts by weight of styrene-butadiene block copolymer (30% of styrene skeleton content and 30 cp of 5% toluene solution viscosity at 25° C.), 35 parts by weight of styrene, 30 parts by weight of methyl methacrylate, 3 parts by weight of n-butyl acrylate, and 25 parts by weight of ethyl benzene.

TEM result of the resin obtained from the above method showed that rubber particles had a double structure of onion and core-shell.

EXAMPLE 4

Rubber-modified styrene copolymer resin was prepared by the same method as Example 1 except that raw material solution mixture comprises 5 parts by weight of styrene-butadiene block copolymer (40% of styrene skeleton content and 39 cp of 5% toluene solution viscosity at 25° C.), 35 parts by weight of styrene, 30 parts by weight of methyl methacrylate, 3 parts by weight of n-butyl acrylate, and 25 parts by weight of ethyl benzene.

TEM result of the resin obtained from the above method showed that rubber particles had a double structure of onion and core-shell.

EXAMPLE 5

Rubber-modified styrene copolymerization resin was prepared by the same method as Example 1 except that the temperature of inlet was 120° C. and the temperature of outlet was 137° C. when feeding raw material solution mixture to the continuous polymerization apparatus having four reactors in a series.

TEM result of the resin obtained from the above method showed that rubber particles had a double structure of onion and core-shell.

COMPARATIVE EXAMPLE 1

Rubber-modified styrene copolymer resin was prepared by the same method as Example 1 except that raw material solution mixture comprises 7 parts by weight of styrene-butadiene block copolymer (22% of styrene skeleton content and 33 cp of 5% toluene solution viscosity at 25° C.), 35 parts by weight of styrene, 30 parts by weight of methyl methacrylate, 3 parts by weight of n-butyl acrylate, and 25 parts by weight of ethyl benzene.

TEM result of the resin obtained from the above method showed that rubber particles had a salami structure.

COMPARATIVE EXAMPLE 2

Rubber-modified styrene copolymer resin was prepared by the same method of Example 1 except that raw material solution mixture comprises 7 parts by weight of styrene-butadiene block copolymer (65% of styrene skeleton content and 40 cp of 5% toluene solution viscosity at 25° C.), 35 parts by weight of styrene, 30 parts by weight of methyl methacrylate, 3 parts by weight of n-butyl acrylate, and 25 parts by weight of ethyl benzene.

TEM result of the resin obtained from the above method showed that rubber particles had a core-shell structure.

Product properties of rubber-modified styrene copolymer resin obtained in the Examples 1 to 5 and lower case 1 to 2 were evaluated by following methods and table 1 shows the results.

a) Average particle size of rubber: 0.5 g of rubber-modified styrene copolymer resin was dissolved in 100 ml of methylethyl kenone and the average particle size of rubber was measured by Coulter Counter (Beckman Coulter Company LS230).
b) Shape of rubber particle: Transmission Electronic Microscope (TEM, Joel Company, JEM-1010) was used to evaluate. After treating osmium tetroxide, super thin cut-specimens were prepared by microtome.
c) Haze: After preparing injection specimen with 3 mm of thickness, it was measured by following the procedure of ASTM 1003.
d) Transmittance: After preparing injection specimen with 3 mm of thickness, it was measured by following the procedure of ASTM 1003.
e) Izod impact strength: After preparing injection specimen with 12.7×64×6.4 mm, it was measured by following the procedure of ASTM D256.

TABLE 1

|  | Ex. 1 | Ex. 2 | Ex. 3 | Ex. 4 | Ex. 5 | Com. Ex. 1 | Com. Ex. 1 |
|---|---|---|---|---|---|---|---|
| Average rubber particle size (μm) | 0.6 | 0.6 | 0.8 | 0.5 | 0.4 | 0.9 | 0.2 |
| Shape of particle | Onion + core-shell | Onion + core-shell | Onion + core-shell | Onion + core-shell | Onion + core-shell | salami | Core-shell |
| Haze (%) | 4.3 | 4.8 | 5.3 | 4.0 | 2.7 | 7.5 | 2.8 |
| Transmittance (%) | 88.3 | 89.8 | 90.0 | 90.1 | 89.4 | 89.7 | 89.9 |
| Izod impact strength (kg · cm/cm) | 7.5 | 8.4 | 9.0 | 5.6 | 3.2 | 9.7 | 3.0 |

As shown in Table 1, double structure of onion and core-shell was obtained in the Examples 1 to 5 of the present invention and the resulting resins show excellent transparency and impact resistance. However, the copolymer resin produced in the Comparative Example 1, which has salami structure, shows poor transparency and the resin obtained in the comparative Example 2, which has the particles of core-shell structures only, shows poor impact resistance.

According to the method of the present invention, the transparent resin containing the rubber particles of a double structure comprising onion and core-shell structure can provide transparent resin of rubber-modified styrene copolymer resin with excellent transparency and impact resistance as well as good gloss.

What is claimed is:

1. A process of preparing transparent resin of rubber-modified styrene copolymer, comprising:
    graft-copolymerizing styrene monomor and (meth)acrylate monomer in the presence of block or random styrene-butadiene copolymer has 30~50% of styrene skeleton content and 20~40 cp of 5% toluene solution viscosity at 25° C.,
    wherein rubber particles dispersed in said transparent resin of said rubber-modified styrene copolymer have a double structure of onion and core-shell.
2. The process of claim 1, further comprising:
    a) preparing raw material solution mixture by dissolving the block or random styrene-butadiene copolymer which has 30~50% of the styrene skeleton content and 20~40 cp of the 5% toluene solution viscosity at 25° C. in a mixed monomer of the styrene monomer and the (meth)acrylate monomer;
    b) graft-copolymerizing said raw material solution mixture of a) in a first reactor of a continuous polymerization apparatus having at least two reactors associated in a series;

c) graft-copolymerizing the copolymer of b) by continuously feeding the copolymer to a second or further reactor of the continuous polymerization apparatus; and d) devolatilizing and palletizing the copolymer of c).

3. The process of claim 1, further comprising:
a) preparing raw material solution mixture by dissolving 3 to 15 parts by weight of the block or random styrene-butadiene copolymer which has 30~50% of the styrene skeleton content and 20~40 cp, of the 5% toluene solution viscosity at 25° C. in 100 parts by weight of a mixture, the mixture comprising:
   i) 30 to 60 parts by weight or the styrene monomer; and
   ii) 40 to 70 parts by weight of the (meth)acrylate monomor;
b) graft-copolymerizing said raw material solution mixture of a) in a first reactor of a continuous polymerization apparatus having at least two reactors associated in a series at a temperature between 120 and 145° C.;
c) graft-copolymerizing the copolymer of b) by continuously feeding the copolymer to a second or further reactor of the continuous polymerization apparatus until final polymerization rate of 60 to 90% is reached; and d) devolatilizing and palletizing the copolymer of c).

4. The process of claim 3, wherein said styrene monomer of a) i) comprises alkyl styrene or halogenated styrene,
wherein the alkyl styrene is selected from the group consisting of styrene, α-methyl styrene, o-methyl styrene, p-methyl styrene, m-methyl styrene, ethyl styrene, i-butyl styrene and t-butyl styrene; and
wherein the halogenated styrene is selected from the group consisting of o-bromo styrene, p-bromo styrene, m-bromo styrene, o-chloro styrene, p-chloro styrene and m-chloro styrene.

5. The process of claim 3, wherein said (meth)acrylate monomer of a)ii) is selected from the group consisting of methyl methacrylate, ethyl methacrylate, n-butyl methacrylate, 2-methyl hexyl acrylate, and 2-ethyl hexyl acrylate.

6. The process of claim 1, wherein said graft-copolymerizing is performed by a polymerization method selected from the group consisting of continuous or batch bulk polymerization, solution polymerization, and bulk-suspension polymerization.

7. The process of claim 1, wherein an average particle size of rubber dispersed in said transparent rubber of the rubber-modified styrene copolymer is less than or equal to 1.2 μm.

8. The process of claim 2, wherein rubber particles dispersed in said transparent resin of the rubber-modified styrene copolymer have a double structure of onion and core-shell structure.

9. The process of claim 3, wherein rubber particles dispersed in said transparent resin of the rubber-modified styrene copolymer have a double structure of onion and core-shell structure.

10. The process of claim 2, wherein an average particle size of rubber dispersed in said transparent rubber of the rubber-modified styrene copolymer is less than or equal to 1.2 μm.

11. The process of claim 3, wherin an average particle size of rubber dispersed in said transparent rubber of the rubber-modified styrene copolymer is less than or equal to 1.2 μm.

* * * * *